United States Patent
Son et al.

(10) Patent No.: US 9,964,767 B2
(45) Date of Patent: May 8, 2018

(54) DISPLAY WITH REFLECTED LED MICRO-DISPLAY PANELS

(71) Applicant: Google Inc., Mountain View, CA (US)

(72) Inventors: Hui Son, San Jose, CA (US); Simon R. Prakash, Los Gatos, CA (US); James C. Dunphy, San Jose, CA (US); Caner Onal, Palo Alto, CA (US); Oscar A. Martinez, Mountain View, CA (US); Philipp H. Schmaelzle, Mountain View, CA (US); Andrei S. Kazmierski, Pleasanton, CA (US); Ozan Cakmakci, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 110 days.

(21) Appl. No.: 15/059,873

(22) Filed: Mar. 3, 2016

(65) Prior Publication Data
US 2017/0255011 A1    Sep. 7, 2017

(51) Int. Cl.
G02B 27/01    (2006.01)
G02B 5/30    (2006.01)
(Continued)

(52) U.S. Cl.
CPC ....... *G02B 27/0172* (2013.01); *G02B 5/3025* (2013.01); *G02B 27/0081* (2013.01);
(Continued)

(58) Field of Classification Search
CPC .............. G02B 27/0172; G02B 5/3025; G02B 2027/013; G02B 27/0132; G02B 27/0174;
(Continued)

(56) References Cited

U.S. PATENT DOCUMENTS

| 6,246,383 B1* | 6/2001 | Ophey ............... G02B 27/0172 345/8 |
| 8,259,239 B2 | 9/2012 | Hua |

(Continued)

FOREIGN PATENT DOCUMENTS

| EP | 0580261 A1 | 1/1994 |
| EP | 2174513 B1 | 5/2014 |

(Continued)

OTHER PUBLICATIONS

Rusli, E. M.—New Chip to Bring Holograms to Smartphones, The Wall Street Journal, Jun. 2, 2014, 6 pages.
(Continued)

*Primary Examiner* — Charles Hicks (57) ABSTRACT

A display apparatus includes a transparent substrate having first and second sides, an array of LED micro-display panels, and an array of collimating reflectors. The LED micro-display panels are disposed within the transparent substrate between the first and second sides and oriented to emit sub-image portions of a display image towards the first side. The collimating reflectors are disposed within the transparent substrate between the first side and the array of LED micro-display panels. The collimating reflectors are aligned with the LED micro-display panels to reflect the sub-image portions back out the second side of the transparent substrate. The LED micro-display panels are offset from the collimating reflectors to expand the sub-image portions prior to reflection by the collimating reflectors.

23 Claims, 4 Drawing Sheets

(51) Int. Cl.
*G06F 3/14* (2006.01)
*G09G 3/32* (2016.01)
*G02B 27/00* (2006.01)

(52) U.S. Cl.
CPC ............ *G06F 3/1446* (2013.01); *G09G 3/32* (2013.01); *G02B 2027/013* (2013.01); *G02B 2027/0125* (2013.01); *G02B 2027/0132* (2013.01); *G02B 2027/0174* (2013.01); *G02B 2027/0178* (2013.01); *G09G 2300/0426* (2013.01)

(58) Field of Classification Search
CPC . G06F 3/1446; G09G 3/32; G09G 2300/0426
See application file for complete search history.

(56) References Cited

U.S. PATENT DOCUMENTS

| | | |
|---|---|---|
| 8,270,086 B1 | 9/2012 | Hall et al. |
| 8,582,209 B1 | 11/2013 | Amirparviz |
| 8,705,177 B1 | 4/2014 | Miao |
| 2006/0061846 A1* | 3/2006 | Sprague ............ G02B 26/0875 359/204.1 |
| 2013/0278631 A1 | 10/2013 | Border et al. |
| 2015/0293358 A1 | 10/2015 | de Matos Pereira Vieira et al. |

FOREIGN PATENT DOCUMENTS

| | | | |
|---|---|---|---|
| KR | 100928226 B1 | 11/2009 | |
| NL | EP 0580261 A1 * | 1/1994 | ........... G02B 27/017 |
| WO | WO 99/30199 A1 | 6/1999 | |

OTHER PUBLICATIONS

Jepsen, M. L. et al., "Display Panel Using Direct Emission Pixel Arrays", U.S. Appl. No. 14/580,682, filed Dec. 23, 2014, whole document.
Cakmakci, O. et al., "Transparent Microdisplay in Head Mountable Displays", U.S. Appl. No. 13/928,725, filed Jun. 27, 2013, whole document.
PCT/US2016/64443—International Search Report and Written Opinion, dated Feb. 23, 2017, 11 pages.

* cited by examiner

DISPLAY WITH REFLECTED LED MICRO-DISPLAY PANELS

TECHNICAL FIELD

This disclosure relates generally to image displays, and in particular but not exclusively, relates to head wearable displays.

BACKGROUND INFORMATION

A head mounted display ("HMD") or head wearable display is a display device worn on or about the head. HMDs usually incorporate some sort of near-to-eye optical system to create a magnified virtual image placed a few meters in front of the user. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD typically includes some form of see-through eyepiece and can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, thickness, field of view, and efficiency of conventional optical systems used to implement existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of an apparatus, system, and method of operation of a display apparatus implemented using an array of reflected light emitted diode ("LED") micro-display panels are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
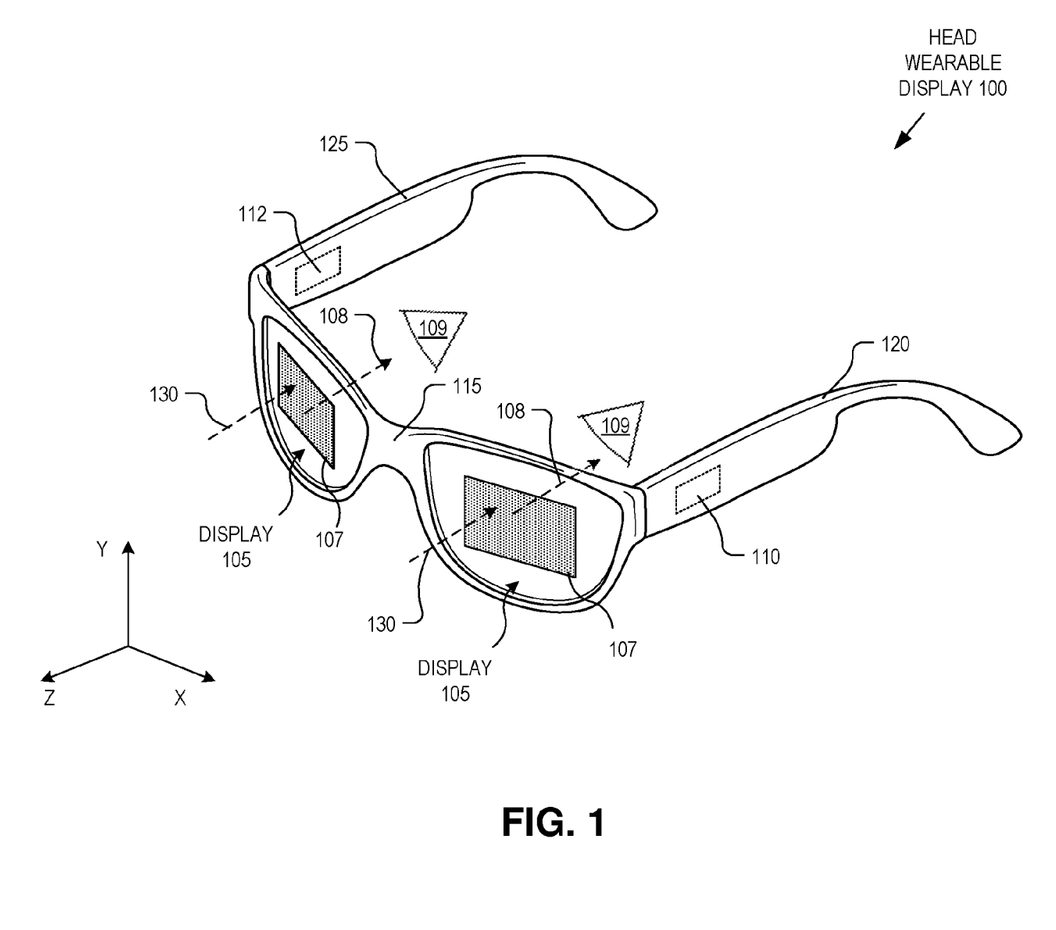
FIG. 1 illustrates a head wearable display system with reflected LED micro-display panels, in accordance with an embodiment of the disclosure.

FIG. 1 is a perspective view illustration of a head wearable display 100 implemented with reflected LED micro-display panels, in accordance with an embodiment of the disclosure. The illustrated embodiment of head wearable display 100 includes displays 105, circuitry 110 and 112, and a frame assembly configured for wearing on a head of a user. Each display 105 includes an active area 107 that includes an array of LED micro-display panels aligned to an array of collimating reflectors that reflect a display image 108 back towards a user's eyes 109. The illustrated embodiment of the frame assembly includes a front frame 115, a left ear arm 120, and a right ear arm 125. In the illustrated embodiment, circuitry 110 and 112 are embedded into or otherwise disposed in or on left ear arm 120 and right ear arm 125, respectively; however, circuitry 110 and 112 may also be distributed in or on front frame 115. Circuitry 110 and 112 may include various electronics including one or more display controllers (e.g., one for each eyepiece 105), a microprocessor, interfaces, one or more wireless transceivers, a battery, a camera module, a speaker, etc.

FIG. 1 illustrates a frame assembly that supports each display 105 in front of a corresponding eye 109. Although FIG. 1 illustrates head wearable display 100 as a binocular system, it may also be implemented as a monocular system. In the illustrated embodiment, displays 105 extend across a substantial portion of a user's field of view and may be implemented as planar or curved eyepieces. FIG. 1 illustrates displays 105 as see-through eyepieces that combine ambient light 130 with display images 108 to present the user with an augmented reality. However, in other embodiments, displays 105 may not be see-through, but rather present the user with a virtual reality. Additionally, head wearable display 100 may assume other shapes and form factors than conventional eyewear, such as goggles, a visor, etc.

FIG. 1 illustrates displays 105 implemented as eyepieces of a head wearable display including a head wearable frame assembly. However, the head wearable configuration is merely a demonstrative application. Embodiments of displays 105 may be incorporated into other types of applications. For example, displays 105 need not be incorporated as a head wearable display with a frame assembly that fits a user's head. Rather, various embodiments of displays 105 may be incorporated into other frame assemblies and other form factors including, but not limited to, see-through windows, windshields, consumer electronics, and various other fixed or portable devices.

Figure 2A:
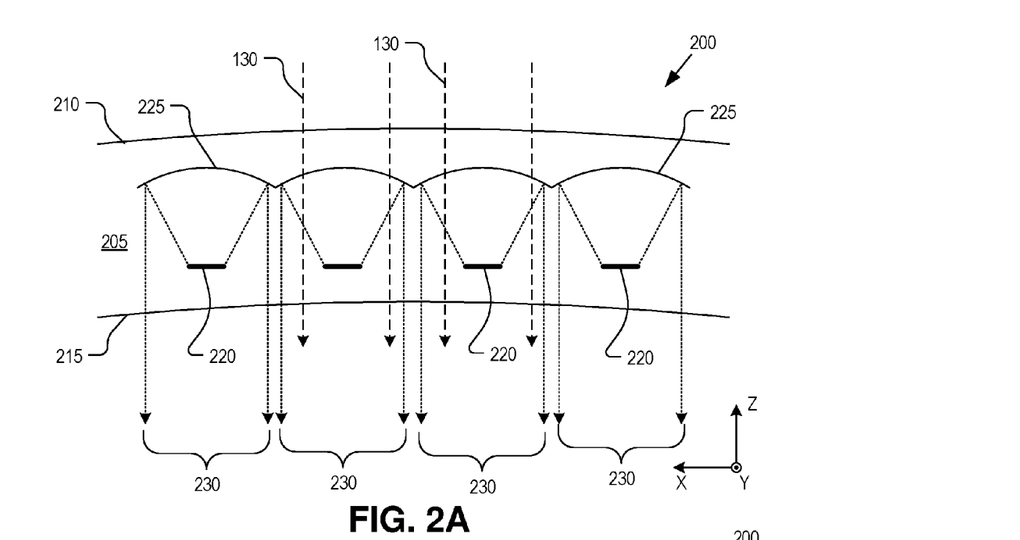
FIG. 2A is a cross-sectional illustration of a display including a transparent substrate with embedded LED micro-display panels and collimating reflectors, in accordance with an embodiment of the disclosure.
Figure 2B:
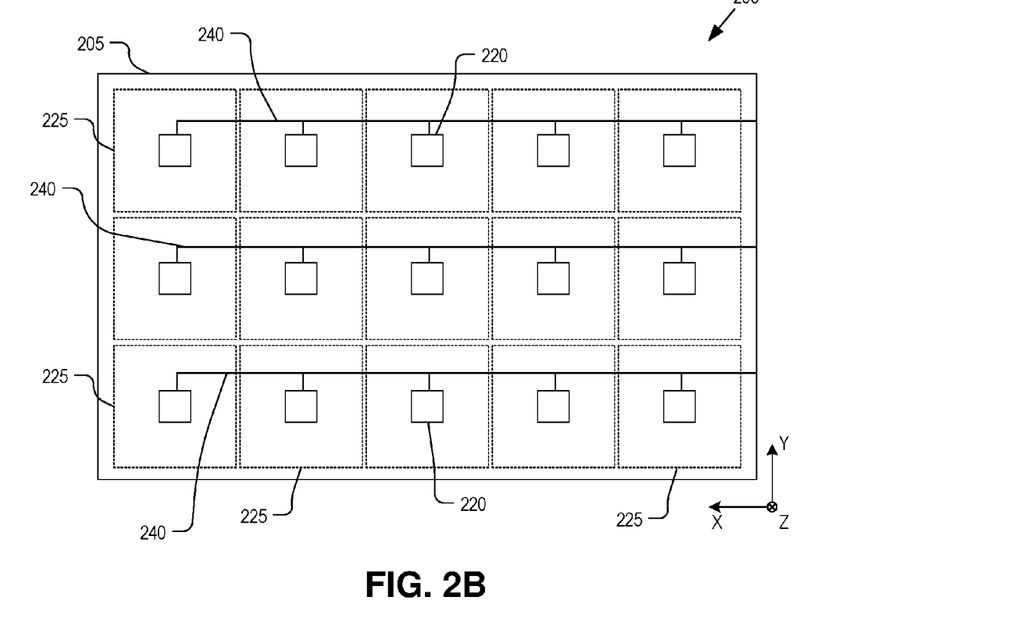
FIG. 2B is a front view illustration of a display including a transparent substrate with embedded LED micro-display panels and collimating reflectors, in accordance with an embodiment of the disclosure.

FIGS. 2A and 2B illustrate a display 200 including LED micro-display panels, in accordance with an embodiment of the disclosure. Displays 105 illustrated in FIG. 1 represent demonstrative implementations of display 200. FIG. 2A is a cross-sectional illustration of display 200 while FIG. 2B is a side view illustration of the same. The illustrated embodiment of display 200 includes a transparent substrate 205 having a first side 210 and a second side 215, an array of LED micro-display panels 220, and an array of collimating reflectors 225. Not all instances of an element are labeled so as not to clutter the drawings.

LED micro-display panels 220 and collimating reflectors 225 are disposed within transparent substrate 205 between first and second sides 210 and 215. Transparent substrate 205 may be a multi-layer laminated structure with LED micro-display panels 220 and collimating reflectors 225 positioned within the laminated layers. In other embodiments, transparent substrate 205 may be a molded piece (e.g., injection molded) formed of clear plastic. Transparent substrate 205 may also be fabricated of other materials such as glass or otherwise.

In the illustrated embodiment, transparent substrate 205 is a curved substrate (e.g., curved eyepiece when incorporated into a head wearable display) but has substantially no optical power as experienced by ambient light 130 when passing through (i.e., external sides 210 and 215 have complementary curvatures). In yet other embodiments, the curvatures of sides 210 and 215 need not be complementary, but rather may provide lensing power (e.g., prescriptive lensing) to ambient light 130.

Although FIG. 2A illustrates LED micro-display panels 220 arranged in a planar array within transparent substrate 205, in other embodiments, LED micro-display panels 220 and/or collimating reflectors 225 are disposed along a curvature, similar to sides 210 or 215, within transparent substrate 205. In such embodiments, chief rays from each LED micro-display panel 220 can be angled to compensate for disposing LED micro-display panels 220 and collimating reflectors 225 along curvatures to achieve correct sub-image portion overlap and alignment. Angling of the chief rays can be achieved by non-uniform tilting of LED micro-display panels 220 and/or collimating reflectors 225 across the display 200. Accordingly, the alignment between paired LED micro-display panels 220 and collimating reflectors 225 may not be identical for all pairs of LED micro-display panels 220 and collimating reflectors 225, but rather may vary across the array to achieve correct alignment (and overlap) of sub-image portions 230.

In FIG. 2A, LED micro-display panels 220 are oriented to emit display light towards first side 210 (away from the viewing direction). LED micro-display panels 220 are multi-pixel array displays (e.g., 100×100 LED pixels each) that each emit a multi-pixel sub-image portion 230. Sub-image portions 230 collectively blend together to form the overall display image 108. LED micro-display panels 230 may be monochromatic or multi-color (e.g., R, G, B) LED displays. In one embodiment, each LED micro-display panel 230 includes a complementary metal-oxide-semiconductor ("CMOS") or other semiconductor substrate with integrated driver circuitry for receiving an image data sub-portion and driving its LED pixel array to emit a corresponding image sub-portion 230. Due to the LED solid state nature of LED micro-display panels 220 and the integrated driver circuitry, LED micro-display panels 220 are substantially non-optically transmissive occlusions to both sub-image portions 230 and ambient light 130. However, due to their small overall size (e.g., 1 mm×1 mm each) and relatively close proximity to eyes 109 (in a near-to-eye display configuration), LED micro-display panels 220 are unseen or nearly unseen by a viewer/user. LED micro-display panels 220 may also be implemented using a variety of other display panel technologies, such as non-pixelated LED displays (e.g., array of icons or segmented digits), organic LED panels, LED direct backlight panels with liquid crystal shutters, or other LED panel configurations.

Collimating reflectors 225 are offset from LED micro-display panels 220 but disposed between first side 210 and LED micro-display panels 220. This offset configuration provides expansion room for sub-image portions 230 to be enlarged (e.g., magnified) prior to reflection by collimating reflectors 225. In the illustrated see-through near-eye display configuration, collimating reflectors 225 are partial reflectors that reduce the divergence of sub-image portions 230 such that eye 109 can easily bring the overall display image 108 into focus. As such, collimating reflectors 225 need not fully collimate the display light, but rather reduce its divergence to displace the virtual image sufficiently back from eyes 109. In some embodiments, sub-image portions 230 are substantially collimated light. Each collimating reflector 225 is aligned with a corresponding LED micro-display panel 220 to reflect its corresponding sub-image portion 230. The sub-image portions 230 reflected by each collimating reflector 225 are aligned and stitched together to form the overall display image 108 in an eyebox area located proximate with a user's eye.

Collimating reflectors 225 are substantially larger than LED micro-display panels 220 such that a majority of the reflected sub-image portions 230 passes around LED micro-display panels 220. Accordingly, although LED micro-display panels 220 are opaque, they are virtually unseen since a majority of the display light 108 and ambient light 130 passes around and between LED micro-display panels 220. Collimating reflectors 225 may be implemented using a variety of partially reflecting structures, such as a curved partially reflective coating (e.g., a beam splitter, a multi-layer dichroic coating, etc.), a diffractive optical element, a holographic optical element, or otherwise. Furthermore, the surface profiles of collimating reflectors 225 may be implemented using a variety of different profile shapes, such as spherical, aspheric, conic, freeform, or otherwise.

In FIGS. 2A and 2B, collimating reflectors 225 abut each other. However, in other embodiments, collimating reflectors 225 may be laid out relative to each other with interstitial gaps to through which ambient light 130 passes unobstructed by collimating reflectors 225. This implementation enables the use of fully or highly reflective mirrors that are otherwise substantially opaque reflectors, while achieving a see-through display. The perimeter shapes of collimating reflectors 225 may also be changed in various embodiments. For example, in other embodiments, collimating reflectors 225 may be hexagonal, circular, or other shapes than the illustrated rectangular shape.

As illustrated in FIG. 2B, LED micro-display panels 220 may be arranged in a grid pattern and interconnected to receive their respective image data sub-portion via signal lines or conductive output lines 240. In one embodiment, conductive output lines 240 are formed of a transparent conductive material such as indium tin oxide ("ITO"), or other conductive materials such as a metal mesh or thin conductive lines to reduce visual impact. In the illustrated embodiment, each row of LED micro-display panels 220 are coupled to a common serial data line; however, in other embodiments, each column of LED micro-display panels 220 may be coupled to a common serial data line. Other connection topologies may be implemented.

In one embodiment, LED micro-display panels 220 emit polarized display light and a polarization layer (not illustrated) is disposed across side 210. By orientating the polarization of this polarization layer to be orthogonal to the polarization of the display light, leakage of the display light out the frontside of display 200 can be prevented or blocked. In other embodiments, spectral filtering layers may be disposed across side 210 to prevent display light leakage.

Figure 3A:
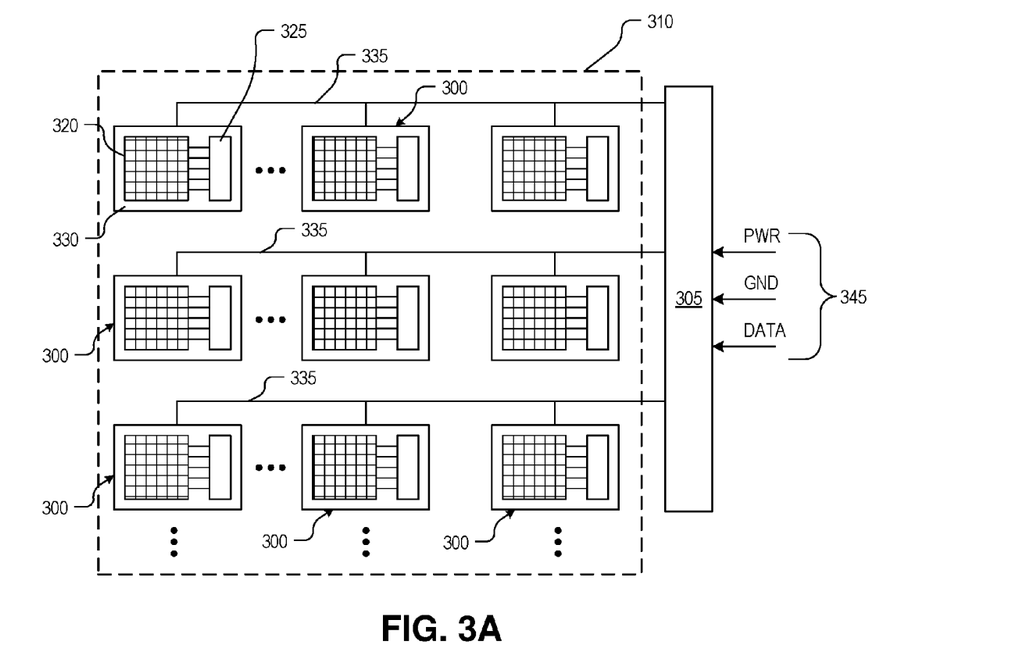
FIG. 3A is a functional block diagram illustrating LED micro-display panels and image segmentation circuitry, in accordance with an embodiment of the disclosure.
Figure 3B:
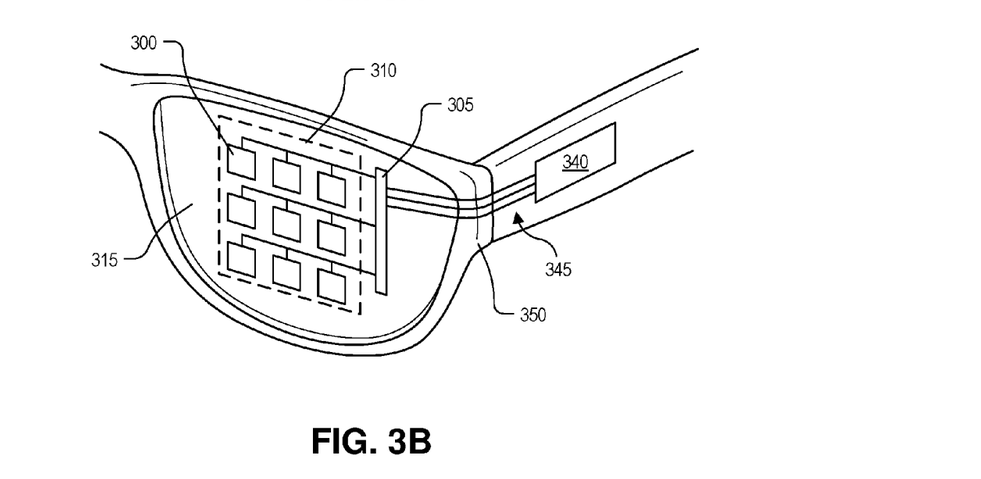
FIG. 3B is a perspective illustration of a portion of a head wearable display showing how image segmentation circuitry is embedded within the transparent substrate adjacent to the array of LED micro-display panels, in accordance with an embodiment of the disclosure.

FIGS. 3A and 3B illustrate LED micro-display panels 300 and image segmentation circuitry 305, in accordance with an embodiment of the disclosure. FIG. 3A is a functional block diagram illustrating a display region 310 including LED micro-display panels 300 along with image segmentation circuitry 305, while FIG. 3B is a perspective illustration of a particular implementation showing how image segmentation circuitry 305 may be embedded within a transparent substrate 315 adjacent to an array of LED micro-display panels 300, in accordance with an embodiment of the disclosure. Display region 310 corresponds to active area 107 in FIG. 1 and represents one possible implementation of display 200. In one embodiment, segmentation circuitry 305 is shifted to the periphery of transparent substrate 315 outside the user's central vision.

As illustrated, each LED micro-display panel 300 includes an LED pixel array 320 and driver circuitry 325 integrated onto a substrate 330. Each LED pixel array 320 may include a number of LED display pixels (e.g., 100×100) that are driven by driver circuitry 325. Driver circuitry 325 of each LED micro-display panel 300 is coupled to segmentation circuitry 305 via a conductive output line 335. In one embodiment, segmentation circuitry 305 is also disposed within transparent substrate 315 and connected to an off-eyepiece display controller 340 via conductive input lines 345 that run in or on a portion of transparent substrate 315 and extend into the frame assembly 350 towards display controller 340. The illustrated embodiment of conductive input lines 345 includes input lines for power, ground, and data. Other combinations of signal/power lines may be implemented. For example, the data line may include more than a single data path.

During operation, display controller 340 generates image data corresponding to a display image and outputs the image data to segmentation circuitry 305 via the DATA conductive input line 345. Segmentation circuitry 305 receive the image data and segments the image data into image data sub-portions, each corresponding to a sub-image portion to be output from a corresponding LED micro-display panel 300. The image data sub-portions are output on conductive output lines 335 to their respective LED micro-display panel 300. In the illustrated embodiment, LED micro-display panels 300 are arranged in a grid pattern with each row of LED micro-display panels 300 sharing a common output conductive line 335. In other embodiments, a column or other grouping of LED micro-display panels 300 may share a common output conductive line 335. Other grid patterns may include hexagonal layouts, irregular grid layouts, non-orthogonal grids, or otherwise. Output conductive lines 335 may be implemented as serial or parallel data buses.

FIGS. 3A and 3B illustrate one example layout of segmentation circuitry 305 where the segmentation functionality is centralized. In other embodiments, the functionality provided by segmentation circuitry 305 may be decentralized and incorporated into driver circuitry 325 on each LED micro-display panel 300. In this embodiment, all image data is routed to all LED micro-display panels 300 and the decentralized segmentation circuitry on each panel is tasked with identifying the image data sub-portion to be displayed by the given panel.

Figure 4:
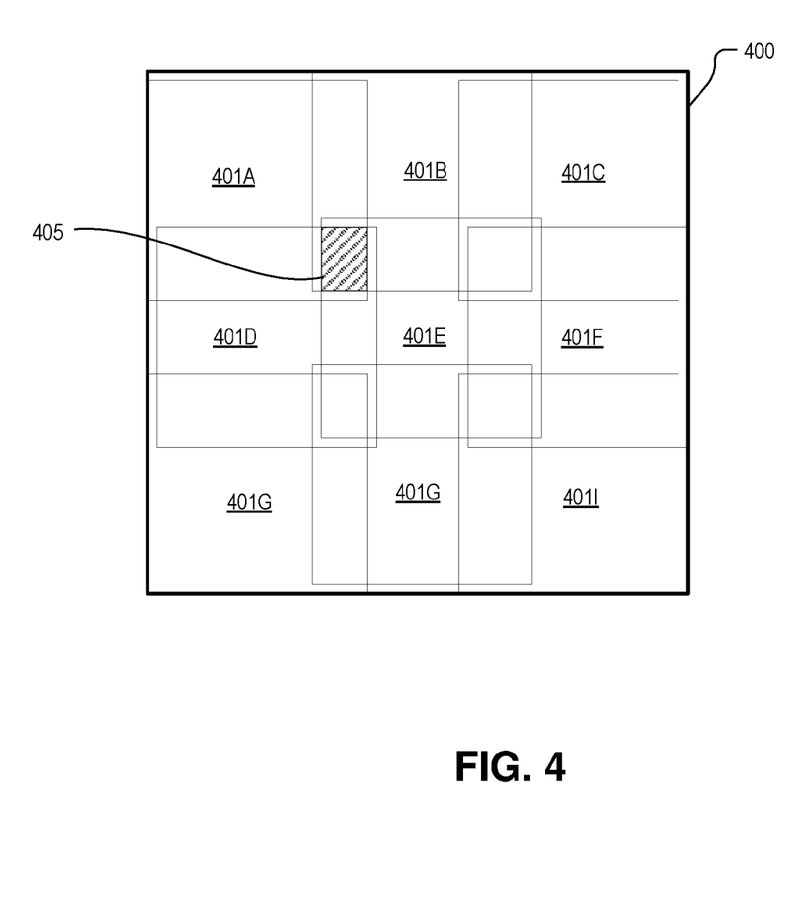
FIG. 4 illustrates how sub-image portions of a display image may be partially overlapped to increase the eyebox of a head wearable display, in accordance with an embodiment of the disclosure.

FIG. 4 illustrates how sub-image portions 401A-I of a display image 400 may be partially overlapped to increase the eyebox of a head wearable display, in accordance with an embodiment of the disclosure. Accordingly, in some overlap regions a given image pixel of the overall display image 400 is generated and output from multiple LED micro-display panels 300. For example, the image pixels within region 405 are generated by the four LED micro-display panels 300 that output sub-image portions 401A, B, D, E. This overlap of sub-image portions 401 serves to increase the size of the eyebox from which the user can view display image 400.

Other overlapping configurations than the illustrated example may be implemented. Although FIG. 4 illustrates partial overlap of nine full color sub-image portions 401, in other embodiments, a different number of the sub-image portions may partially or completely overlap. In one embodiment, three sub-image portions each representing a different monochrome image portion (e.g., red sub-image portion, green sub-image portion, and blue sub-image portion) may fully overlap to present the user with a full color display image. In one embodiment of a full or complete sub-image overlap configuration, the collimating reflectors may be spectrally selective mirrors.

The operations explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A display apparatus, comprising:
   a transparent substrate having a first side and second side;
   an array of light emitting diode ("LED") micro-display panels disposed within the transparent substrate between the first and second sides and oriented to emit sub-image portions of a display image towards the first side; and
   an array of collimating reflectors disposed within the transparent substrate between the first side and the array of LED micro-display panels, wherein the collimating reflectors are aligned with the LED micro-display panels to reflect the sub-image portions back out the second side of the transparent substrate, wherein the LED micro-display panels are positioned a distance away from the collimating reflectors to magnify the sub-image portions prior to reflection by the collimating reflectors.

2. The display apparatus of claim 1, wherein the LED micro-display panels are smaller than the collimating reflectors such that a majority of light of a given sub-image portion emitted by a given LED micro-display panel and reflected by a given collimating reflector passes around the given LED micro-display panel.

3. The display apparatus of claim 2, wherein the collimating reflectors comprise opaque mirrors with gaps between adjacent mirrors to allow ambient light to pass through the array of collimating reflectors.

4. The display apparatus of claim 1, wherein the collimating reflectors comprise partial reflectors.

5. The display apparatus of claim 4, wherein the collimating reflectors each comprise one of a curved partially reflective coating, a diffractive reflector, or a holographic reflector.

6. The display apparatus of claim 4, wherein the display apparatus comprises a see-through display that combines the display image with ambient light incident upon the first side of the transparent substrate and wherein the ambient light passing through the transparent substrate passes through the collimating reflectors and between and the LED micro-display panels.

7. The display apparatus of claim 1, wherein the LED micro-display panels each include an LED pixel array and driver circuitry coupled to drive the LED pixel array to output one of the sub-image portions.

8. The display apparatus of claim 7, wherein the sub-image portions of adjacent ones of the LED micro-display panels partially overlap to increase an eyebox of the display apparatus.

9. The display apparatus of claim 7, further comprising:
   image segmentation circuitry disposed within the transparent substrate adjacent to the array of LED micro-display panels;
   conductive input lines disposed in or on the transparent substrate and extending between the image segmentation circuitry and an edge of the transparent substrate to deliver power and image data to the image segmentation circuitry from external to the transparent substrate; and
   conductive output lines disposed in or on the transparent substrate and extending between the image segmentation circuitry and the LED micro-display panels, wherein the image segmentation circuitry includes circuitry coupled to receive the image data representing the display image over one or more of the conductive input lines, coupled to segment the image data into image data sub-portions corresponding to the image sub-portions, and coupled to output the image data sub-portions on the conductive output lines to the LED micro-display panels.

10. The display apparatus of claim 9, where the LED micro-display panels are disposed in a grid pattern and wherein the conductive output lines each couple to all LED micro-display panels within a given column of the grid pattern or each couple to all LED micro-display panels within a given row of the grid pattern.

11. The display apparatus of claim 9, wherein the display apparatus comprises a head wearable display and the transparent substrate comprises a curved eyepiece, the display apparatus further comprising:
    a frame assembly to support the transparent substrate for wearing on a head of a user with the array of LED micro-display panels and the array of collimating reflectors disposed in front of an eye of the user; and
    a display controller disposed within an ear arm of the frame assembly to generate the display image, the display controller coupled to the image segmentation circuitry via the one or more of the conductive input lines.

12. A head wearable display system, comprising:
    a transparent substrate having a first side and second side;
    an array of light emitting diode ("LED") micro-display panels disposed within the transparent substrate between the first and second sides and oriented to emit sub-image portions of a display image towards the first side;
    an array of collimating reflectors disposed within the transparent substrate between the first side and the array of LED micro-display panels, wherein the collimating reflectors are aligned with the LED micro-display panels to reflect the sub-image portions back out the second side of the transparent substrate;
    a frame assembly to support the transparent substrate for wearing on a head of a user with the transparent substrate in front of an eye of the user; and
    a display controller disposed within the frame assembly to generate image data representing the display image.

13. The head wearable display system of claim 12, further comprising:
    image segmentation circuitry coupled to the display controller to receive the image data, to segment the image data into image data sub-portions corresponding to the image sub-portions, and coupled to output the image data sub-portions to the LED micro-display panels.

14. The head wearable display system of claim 13, wherein the image segmentation circuitry is disposed within the transparent substrate adjacent to the array of LED micro-display panels.

15. The head wearable display system of claim 13, where the LED micro-display panels are disposed in a grid pattern and wherein all LED micro-display panels within a given column of the grid pattern or all LED micro-display panels within a given row of the grid pattern are coupled to the image segmentation circuitry via a common conductive signal line.

16. The head wearable display system of claim 12, wherein the LED micro-display panels are smaller than the collimating reflectors such that a majority of light of a given sub-image portion emitted by a given LED micro-display panel and reflected by a given collimating reflector passes around the given LED micro-display panel.

17. The head wearable display system of claim 12, wherein the collimating reflectors comprise partial reflectors.

18. The head wearable display system of claim 17, wherein the collimating reflectors each comprise one of a curved partially reflective coating, a diffractive reflector, or a holographic reflector.

19. The head wearable display system of claim 17, wherein the head wearable display system comprises a see-through display that combines the display image with ambient light incident upon the first side of the transparent substrate and wherein the ambient light passing through the transparent substrate passes through the collimating reflectors and between and the LED micro-display panels.

20. The head wearable display of claim 12, wherein the LED micro-display panels each include an LED pixel array and driver circuitry coupled to drive the LED pixel array to output one of the sub-image portions.

21. The head wearable display of claim 12, wherein the sub-image portions of adjacent ones of the LED micro-display panels partially overlap to increase an eyebox of the display apparatus.

22. The head wearable display of claim 12, wherein the LED micro-display panels output polarized display light, and wherein the head wearable display panel further comprises:

a polarizing layer disposed across the first side of the transparent substrate having an orthogonal polarization to the polarized display light to prevent the polarized display light from leaking out the first side.

23. The head wearable display of claim 12, wherein the array of LED micro-display panels comprises an array of organic LED micro-display panels.

* * * * *